(12) United States Patent
Sung

(10) Patent No.: US 12,187,185 B2
(45) Date of Patent: Jan. 7, 2025

(54) APPARATUS AND METHOD FOR CONTROLLING INTELLIGENT LAMP

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 359 days.

(21) Appl. No.: 17/872,078

(22) Filed: Jul. 25, 2022

(65) Prior Publication Data
US 2023/0167962 A1    Jun. 1, 2023

(30) Foreign Application Priority Data
Nov. 29, 2021   (KR) .......................... 10-2021-0167316

(51) Int. Cl.
| | | |
|---|---|---|
| B60Q 1/08 | (2006.01) | |
| B60Q 1/076 | (2006.01) | |
| B60Q 1/14 | (2006.01) | |
| F21S 41/141 | (2018.01) | |
| F21S 41/663 | (2018.01) | |
| G06T 7/11 | (2017.01) | |
| G06T 7/70 | (2017.01) | |
| G06V 10/26 | (2022.01) | |
| G06V 20/58 | (2022.01) | |

(52) U.S. Cl.
CPC ............. *B60Q 1/143* (2013.01); *B60Q 1/076* (2013.01); *B60Q 1/08* (2013.01); *F21S 41/141* (2018.01); *F21S 41/663* (2018.01); *G06T 7/11* (2017.01); *G06T 7/70* (2017.01); *G06V 10/26* (2022.01); *G06V 20/58* (2022.01); *G06T 2207/20021* (2013.01); *G06T 2207/30252* (2013.01)

(58) Field of Classification Search
CPC .......... B60Q 1/076; B60Q 1/08; B60Q 1/143; G06T 7/10; G06T 7/11; G06T 2207/20021; G06T 2207/30252; G60V 10/26; G60V 20/58; F21S 41/141; F21S 41/663
See application file for complete search history.

(56) References Cited

U.S. PATENT DOCUMENTS

| | | | |
|---|---|---|---|
| 2016/0250964 A1* | 9/2016 | Takagaki ................. | B60Q 1/08 362/466 |
| 2020/0139878 A1* | 5/2020 | Sung ........................ | B60Q 1/28 |

\* cited by examiner

*Primary Examiner* — Jimmy T Vu
(74) *Attorney, Agent, or Firm* — NovoTechIP International PLLC

(57) ABSTRACT

Disclosed are an apparatus and a method for controlling an intelligent lamp. The apparatus includes a camera that photographs an image of a front control area, a pattern analysis device that checks a target location for a control area of the camera, logs data for each segment corresponding to the target location, and analyzes a light-on/off frequency pattern, and a controller that adjusts a margin width of an anti-glare area for a preceding vehicle by calculating a light-on/off frequency corresponding to a location of the front vehicle based on the light-on/off frequency pattern when the front vehicle is detected.

20 Claims, 10 Drawing Sheets

APPARATUS AND METHOD FOR CONTROLLING INTELLIGENT LAMP

CROSS-REFERENCE TO RELATED APPLICATIONS

This application claims the benefit of priority to Korean Patent Application No. 10-2021-0167316, filed in the Korean Intellectual Property Office on Nov. 29, 2021, the disclosure of which is incorporated herein by reference in its entirety.

BACKGROUND

1. Technical Field

The present disclosure relates to an apparatus and a method for controlling an intelligent lamp.

2. Discussion of Related Art

An intelligent lamp system, which is a technology for securing the driver's visibility by recognizing the presence of a vehicle based on a night light source recognition technology of a front camera, determining the location, and controlling the high beam, is required to prevent glare of an oncoming vehicle and/or a preceding vehicle during high beam irradiation.

The intelligent lamp system sets a margin width for glare prevention in a significant portion of the left and right sides of the vehicle to prevent glare, and performs anti-glare technology based on the margin width.

However, because the margin width for preventing glare is fixedly set, when driving in a section with a gentle curvature, such as a straight road, the allowance width is set to be unnecessarily large so that the driver's visibility may be deteriorated.

In addition, when driving in a section with extreme curvature, such as a curved road, it may cause glare to the driver of another vehicle due to insufficient margin, which may result in a safety risk.

SUMMARY

The present disclosure has been made to solve the above-mentioned problems occurring in the prior art while advantages achieved by the prior art are maintained intact.

An aspect of the present disclosure provides an apparatus and method for controlling an intelligent lamp capable of improving visibility of a driver of a vehicle through control of a headlamp and minimizing glare to a driver of a front or preceding vehicle.

Another aspect of the present disclosure provides an apparatus and method for controlling an intelligent lamp capable of subdividing a control area in front of the vehicle into micro-sections (segments) to analyze in real time a light-on/off frequency pattern for each micro-section according to the driving environment and location, and variably adjusting a margin width of an anti-glare area according to the light-on/off frequency for each location of a front vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling an intelligent lamp includes a camera that photographs an image of a front control area, a pattern analysis device that checks a target location for a control area of the camera, logs data for each segment corresponding to the target location, and analyzes a light-on/off frequency pattern, and a controller that adjusts a margin width of an anti-glare area for a front vehicle by calculating a light-on/off frequency corresponding to a location of the front vehicle based on the light-on/off frequency pattern when the front vehicle is detected.

In an embodiment, the controller may determine a degree of subdivision of the control area by dividing a field of view (FOV) of the camera into a number (N) of segments.

In an embodiment, the controller may divide the control area of the camera into a plurality of virtual matrix control sections corresponding to the degree of subdivision, and recognize each of the divided virtual matrix control sections as one segment.

In an embodiment, the controller may obtain target location information for each of the virtual matrix control sections.

In an embodiment, the pattern analysis device may recognize a number of times an LED of a headlamp is turned on and then turned off for each segment as one cycle, and determine the number of times the LED is turned on and off within a specified time.

In an embodiment, the light-on/off frequency pattern may vary corresponding to a driving environment and a location of the vehicle.

In an embodiment, the controller may calculate a light-on/off frequency for each segment corresponding to the location of the front vehicle, and adjust the margin width of the anti-glare area for the front vehicle based on a sum of light-on/off frequencies for each segment.

In an embodiment, the controller may adjust the margin width of the anti-glare area for the front vehicle to be wider as the sum of the light-on/off frequencies for each segment increases.

In an embodiment, the controller may adjust the margin width of the anti-glare area for the front vehicle to be wider when the front vehicle is located closer to a vehicle than when the front vehicle is located farther away from the vehicle.

In an embodiment, the controller may adjust the margin width of the anti-glare area for the front vehicle to be wider when the front vehicle travels on a curved road than when the front vehicle travels on a straight road.

In an embodiment, the apparatus may further include a data collection device that collects driving environment information of a road on which a vehicle travels.

According to an aspect of the present disclosure, a method of controlling an intelligent lamp includes analyzing a light-on/off frequency pattern by checking a target location for a control area of a camera and logging data for each segment corresponding to the target location, and adjusting a margin width of an anti-glare area for a front or preceding vehicle by calculating a light-on/off frequency corresponding to a location of the front vehicle based on the light-on/off frequency pattern when the front vehicle is detected.

In an embodiment, the method may further include determining a degree of subdivision of the control area by dividing a field of view (FOV) of the camera into a number of segments (N) before analyzing light-on/off frequency pattern.

In an embodiment, the determining of the degree of subdivision of the control area may include dividing the control area of the camera into a plurality of virtual matrix control sections corresponding to the degree of subdivision.

In an embodiment, the method may further include obtaining target location information for each of the virtual matrix control sections through the camera.

In an embodiment, the analyzing of the light-on/off frequency pattern may include recognizing a number of times an LED of a headlamp is turned on and then turned off for each segment as one cycle, and determining the number of times the LED is turned on and off within a specified time.

In an embodiment, the adjusting of the margin width of the anti-glare area may include calculating the light-on/off frequency for each segment corresponding to the location of the front vehicle, and adjusting the margin width of the anti-glare area for the front vehicle based on a sum of light-on/off frequencies for each segment.

In an embodiment, the adjusting of the margin width of the anti-glare area may include adjusting the margin width of the anti-glare area for the front vehicle to be wider as the sum of the light-on/off frequencies for each segment increases.

In an embodiment, the adjusting of the margin width of the anti-glare area may include adjusting the margin width of the anti-glare area for the front vehicle to be wider when the front vehicle is located closer to a vehicle than when the front vehicle is located farther away from the vehicle.

In an embodiment, the adjusting of the margin width of the anti-glare area may include adjusting the margin width of the anti-glare area for the front vehicle to be wider when the front vehicle travels on a curved road than when the front vehicle travels on a straight road.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
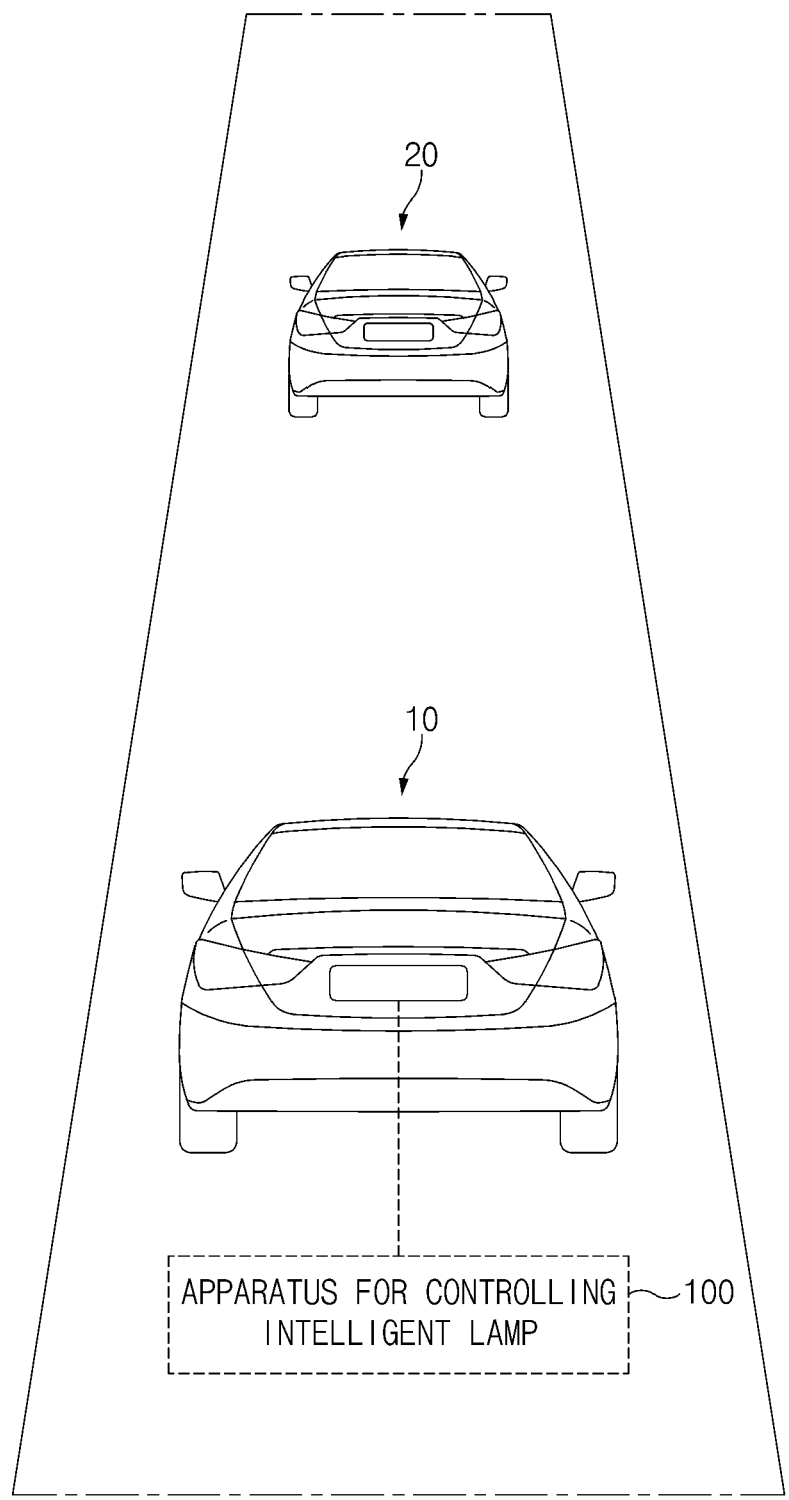
FIG. 1 is a diagram illustrating a vehicle to which an apparatus for controlling an intelligent lamp according to an embodiment of the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
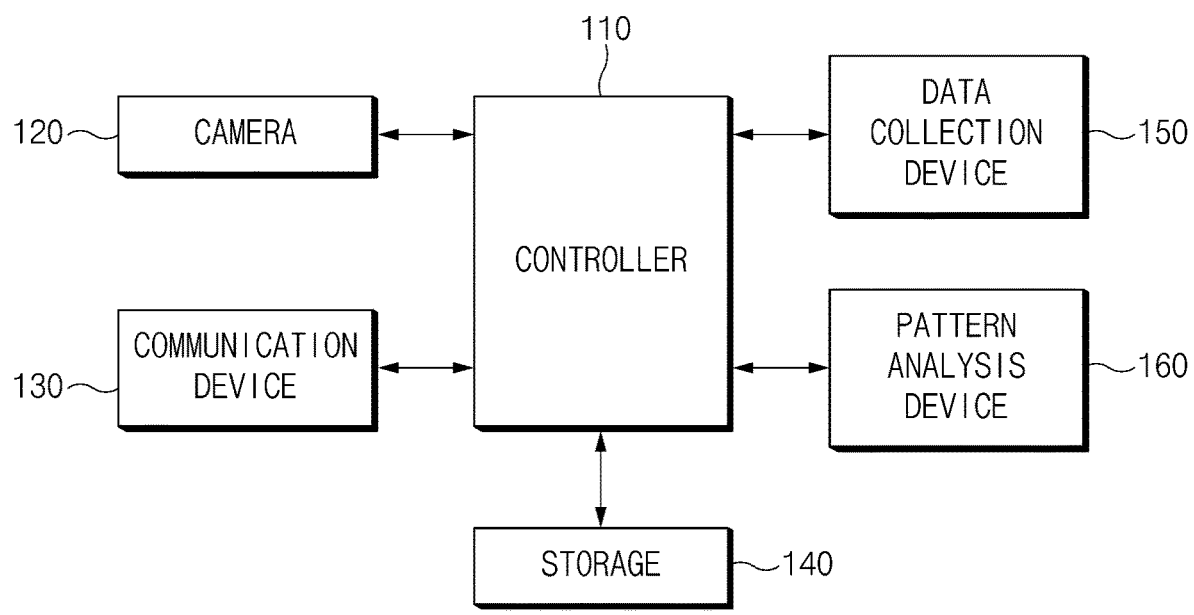
FIG. 2 is a block diagram illustrating the configuration of an apparatus for controlling an intelligent lamp according to an embodiment of the present disclosure.

FIG. 1 is a diagram illustrating a vehicle to which an apparatus for controlling an intelligent lamp according to an embodiment of the present disclosure is applied. FIG. 2 is a block diagram illustrating the configuration of an apparatus for controlling an intelligent lamp according to an embodiment of the present disclosure.

Referring to FIG. 1, a vehicle 10 may include a headlamp for irradiating light to the road ahead during night driving, and an apparatus 100 for controlling an intelligent lamp that controls the irradiation direction and intensity of the headlamp.

The headlamp may be formed by arranging a plurality of LEDs in a matrix form. Each of the plurality of LEDs may be driven independently. The light-on/off state and brightness of each LED may be adjusted according to the driving environment and the location of the vehicle.

When the vehicle 10 irradiates light toward the road in front of the vehicle which is being driven by using the headlamp, the light irradiated from the vehicle 10 may cause glare to the driver of a front or preceding vehicle 20 such as a preceding vehicle and/or an oncoming vehicle.

To this end, the apparatus 100 for controlling an intelligent lamp may variably control the irradiation range of the headlamp corresponding to the driving environment such as a type of driving road, weather, ambient brightness, and the like, and the location of the front vehicle 20, thereby minimizing the glare of the driver of the front vehicle 20.

In particular, the apparatus 100 for controlling an intelligent lamp may minimize the glare of the driver of the front vehicle 20 by variably controlling the margin width of a glare free area (GFA) set at each of the left and right sides of the front vehicle 20, thereby improving the visibility of the driver of the vehicle 10.

The intelligent lamp control apparatus 100 according to the present disclosure may be implemented inside the vehicle 10. In this case, the apparatus 100 for controlling an intelligent lamp may be integrally formed with internal control units of the vehicle 10, or may be implemented as a separate device and connected to the control devices of the vehicle 10 through a separate connection device. Accordingly, the details of the apparatus 100 for controlling an intelligent lamp will refer to the embodiment of FIG. 2.

Referring to FIG. 2, the apparatus 100 for controlling an intelligent lamp may include a controller 110, a camera 120, a communication device 130, storage 140, a data collection device 150, and a pattern analysis device 160.

The controller 110 according to the embodiment may be a hardware device such as a processor or a central processing unit (CPU), or a program implemented by the processor. The controller 110 may be connected to each component of the intelligent lamp control apparatus 100 to perform an overall function of intelligent lamp control.

For example, the controller 110 may control the operation of the camera 120, and may determine a degree of subdivision of a control area in front of a vehicle, monitored by the camera 120.

The camera 120 may be a front camera that is arranged to face the front of the vehicle 10 and photographs an image of the road ahead.

The controller 110 may determine the degree of subdivision of the control area by dividing the field of view (FOV) of the camera 120 by the number N of segments. In this case, the number N of segments may be controlled corresponding to various factors such as the performance of the camera 120, the surrounding environment, and the like.

The control area may correspond to a photographing area. When the degree of subdivision of the control area is determined, the controller 110 may divide the control area into a plurality of virtual matrix control sections corresponding to the degree of subdivision, and allocate the virtual matrix control sections to the photographing area. In this case, each of the virtual matrix control sections may be recognized as one segment.

Accordingly, when the degree of subdivision of the control area is determined, the camera 120 may provide target location information for the subdivided virtual matrix control section to the controller 110 and/or the data collection device 150.

The communication device 130 may include a communication module for vehicle network communication with electric devices and/or controllers provided in the vehicle 10. For example, the communication device 130 may transmit a control signal to a headlamp provided in the vehicle 10. In this case, the vehicle network communication technology may include controller area network (CAN) communication, local interconnect network (LIN) communication, flex-ray communication, and the like.

In addition, the communication device 130 may include a communication module for wireless Internet access or a communication module for short-range communication.

In this case, the wireless Internet technology may include wireless LAN (WLAN), wireless broadband (Wibro), Wi-Fi, world interoperability for microwave access (Wimax), and the like.

In addition, the short-range communication technology may include Bluetooth, ZigBee, ultra-wideband (UWB), radio frequency identification (RFID), infrared data association (IrDA), and the like.

The storage 140 may store data and/or algorithms required to operate the apparatus 100 for controlling an intelligent lamp. In this case, the storage 140 may include a storage medium such as a random access memory (RAM), a static random access memory (SRAM), a read-only memory (ROM), a programmable read-only memory (PROM), and an electrically erasable programmable read-only memory (EEPROM).

In addition, the controller 110 may control the operations of the data collection device 150 and the pattern analysis device 160.

The data collection device 150 may collect driving environment information while the vehicle 10 is driving. For example, the data collection device 150 may collect information on the type of the road ahead (a straight road, a curved road, an intersection, and the like). In this case, the data collection device 150 may collect type information of the road ahead through a navigation device of the vehicle 10. In addition, the data collection device 150 may collect information such as the location and size of the front vehicle 20 recognized by the camera 120.

In addition, the data collection device 150 may collect information on the camera 120. As an example, the data collection device 150 may collect target location information of the divided control section (virtual matrix control section) of the camera 120.

The pattern analysis device 160 may check the target location for the divided control section (virtual matrix control section) of the camera 120, and log real-time data for each segment corresponding to the target location. In this case, the data logged by the pattern analysis device 160 in real time may be data captured by the camera 120.

The pattern analysis device 160 analyzes a light-on/off frequency pattern based on data logged in real time for each segment. For example, the pattern analysis device 160 may recognize the number of times the LED of the headlamp for each segment is turned on and off as one time, and determine the number of times the LED is turned on and off within a specified time in order to analyze the light-on/off frequency pattern for each segment.

The light-on/off frequency pattern analyzed by the pattern analysis device 160 may be stored in the storage 140.

Figure 3:
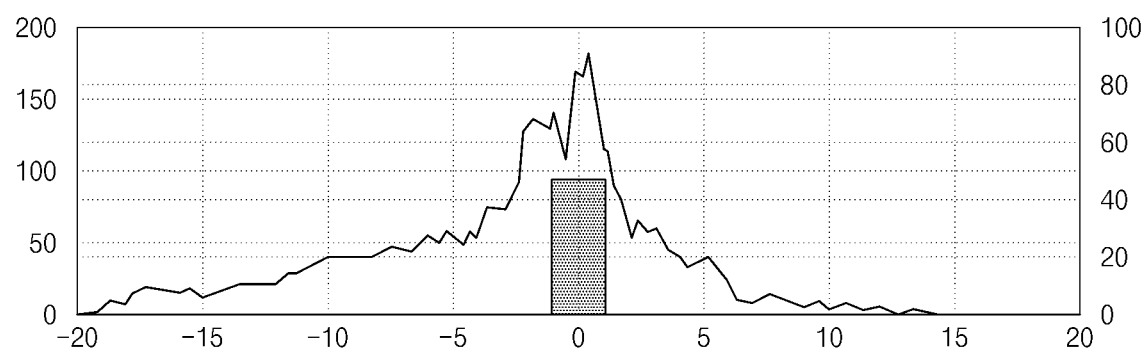
FIGS. 3, 4A, 4B, 5A, 5B, 6A and 6B are diagrams illustrating the operation of an apparatus for controlling an intelligent lamp according to an embodiment of the present disclosure.

In this case, an example of the light-on/off frequency pattern will refer to FIG. 3.

Referring to FIG. 3, the light-on/off frequency pattern may be configured in a graph form.

In the graph of FIG. 3, the horizontal axis may represent segments, and may be divided into—20 segments on the left and 20 segments on the right based on the center '0' of the vehicle 10. That is, the graph of FIG. 3 illustrates the light-on/off frequency pattern in a state in which the control area is subdivided into 40 segments. Of course, the number of segments may vary according to the degree of subdivision of the control area of the camera 120.

In addition, in the graph of FIG. 3, the vertical axis represents the light-on/off frequency.

It may be understood that the closer to the center of the vehicle 10, the higher the light-on/off frequency. In addition, it may be understood that the light-on/off frequency on the left side is higher than on the right side at the same position. However, the light-on/off frequency pattern illustrated in FIG. 3 is only an exemplary embodiment and is not limited thereto. The light-on/off frequency pattern may vary depending on the type of driving road or various road conditions.

For example, in the case of a straight road, the light-on/off frequency may be high at the center of the vehicle 10, and the light-on/off frequencies at the left and right sides may appear uniformly. Meanwhile, when an entrance or exit exists on the right side of a straight road, the light-on/off frequency at the right side may be higher than at the left side. In addition, in the case of a curved road, the light-on/off frequency may appear higher in the curved direction of the road.

As described above, the light-on/off frequency pattern may vary corresponding to the driving environment and the location of the vehicle 10.

Accordingly, the pattern analysis device 160 may analyze and store the on/off frequency pattern for each segment in real time based on the data obtained through the photographing of the camera 120 while the vehicle 10 is driving. In this case, the analysis in real time may mean analysis every hour, but may also include analysis periodically in every specified time unit.

Meanwhile, the pattern analysis device 160 may additionally analyze the occupancy of the segment occupied by the headlamp when analyzing the on/off frequency pattern for each segment. In this case, the occupancy of the headlamp may also be reflected in adjusting the margin width of the anti-glare area.

When the front vehicle 20 is detected while driving, the controller 110 reads out the light-on/off frequency pattern analyzed by the pattern analysis device 160, and based on the light-on/off frequency pattern read, calculates the light-on/off frequency for the front vehicle 20. In this case, the controller 110 checks the left and right widths of the front vehicle 20, and calculates the light-on/off frequency of the segment corresponding to the left and right widths of the front vehicle 20.

The controller 110 may adjust the margin width of the anti-glare area for the front vehicle 20 based on a value obtained by summing the light-on/off frequencies calculated for each segment corresponding to the left and right widths of the front vehicle 20.

In this case, the controller 110 may adjust the margin width of the anti-glare area in proportion to the sum of the light-on/off frequencies calculated for each segment. That is, the controller 110 may adjust the margin width of the anti-glare area to be wider as the sum of the light-on/off frequencies calculated for each segment increases.

Accordingly, an example of an operation of adjusting the margin width of the anti-glare area for the front vehicle 20 will be described with reference to FIGS. 4A to 6B.

Figure 4A:
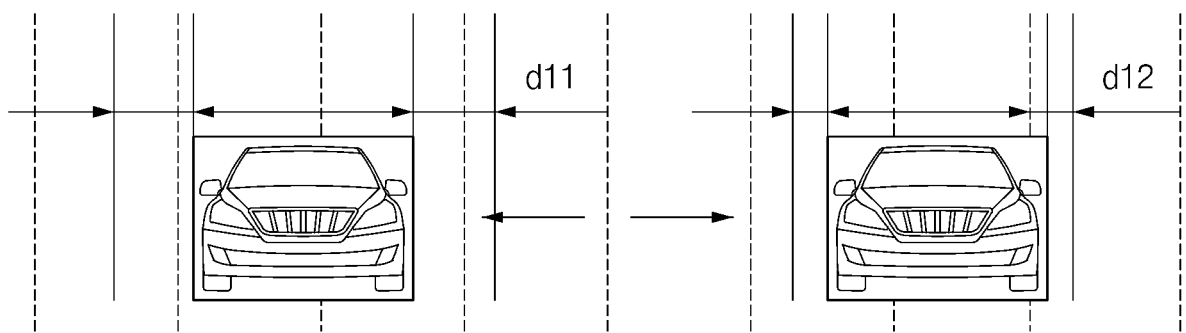
Figure 4B:
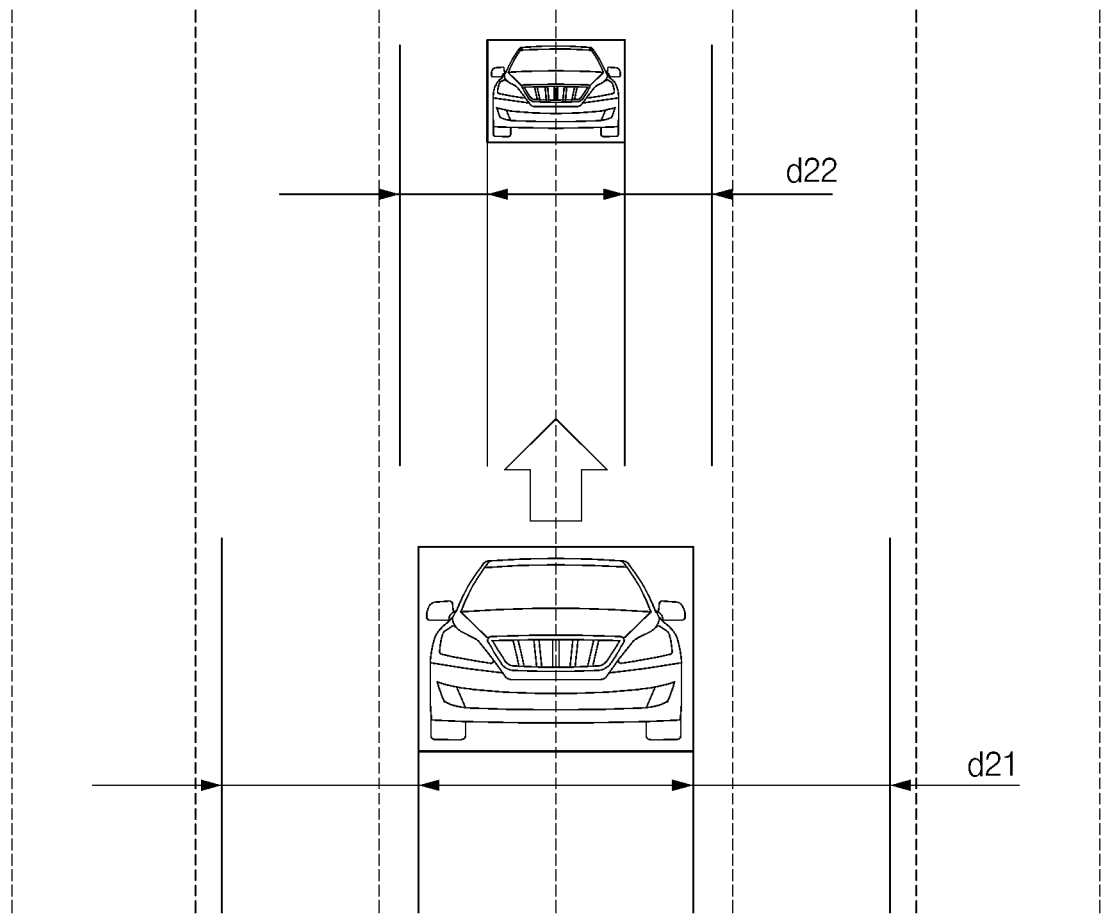

First, FIG. 4A is a diagram illustrating an example of adjusting the margin width of the anti-glare area corresponding to the left and right positions of a front or preceding vehicle. FIG. 4B is a diagram illustrating an example of adjusting the margin width of the anti-glare area corresponding to the distance from a front or preceding vehicle. In the examples of FIGS. 4A and 4B, the margin width of the anti-glare area is adjusted based on the light-on/off frequency pattern illustrated in FIG. 3.

The light-on/off frequency pattern of FIG. 3 has the highest light-on/off frequency at the center of the vehicle 10 and gradually decreases toward the left and right sides, and the light-on/off frequency of the left side is higher than that of the right side.

Referring to FIG. 4A, when the front vehicle 20 is located in the −16 to −8 segments on the left based on the center of the vehicle 10, the controller 110 may adjust the margin width of the anti-glare area to d11 based on the sum of the light-on/off frequencies of the −16 to −8 segments.

Meanwhile, when the front vehicle 20 is located in 8 to 16 segments on the right from the center of the vehicle 10, the controller 110 may adjust the margin width of the anti-glare area to d12 based on the sum of the light-on/off frequencies of the 8 to 16 segments.

In this case, the value obtained by summing the light-on/off frequencies of −16 to −8 segments on the left is greater than the value obtained by summing the light-on/off frequencies of 8 to 16 segments. Accordingly, the d11 may be set to be wider than the d12.

Meanwhile, the front vehicle 20 traveling in the same line as the vehicle 10 is located in segments of the central portion of the vehicle 10. However, when the front vehicle 20 is located at a close distance, the range of segments occupied by the front vehicle 20 is wide. To the contrary, when the front vehicle 20 is located at a long distance, the range of segments occupied by the front vehicle 20 is narrowed.

Referring to FIG. 4B, the front vehicle 20 located at a distance close to the vehicle 10 may be located in −5 to 5 segments. In this case, the controller 110 may adjust the extra width of the anti-glare area to d21 based on the sum of the light-on/off frequencies of −5 to 5 segments.

Meanwhile, the front vehicle 20 located at a long distance from the vehicle 10 may be located in the −2 to 2 segments. In this case, the controller 110 may adjust the margin width of the anti-glare area to d22 based on the sum of the light-on/off frequencies of −2 to 2 segments.

In this case, because the front vehicle 20 located at a close distance occupies segments in a wider range than the front vehicle 20 located at a far distance, the sum of the light-on/off frequencies of the segments is larger. Accordingly, the d21 may be set wider than the d22.

Figure 5A:
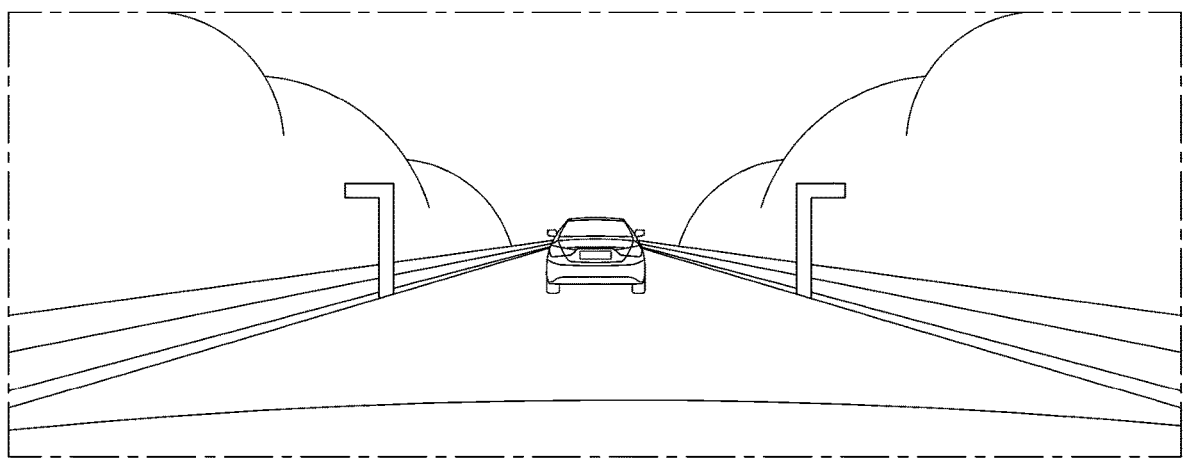
Figure 5B:
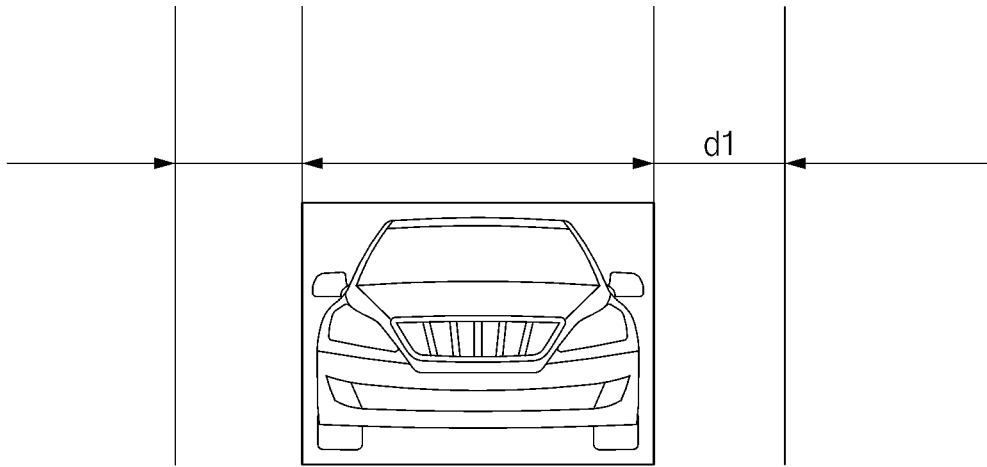
Figure 6A:
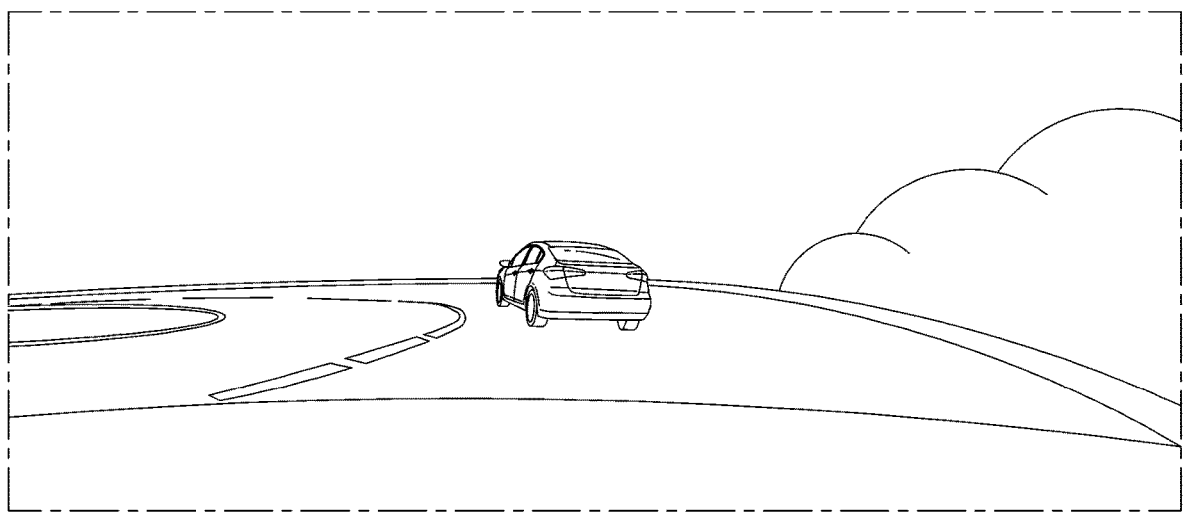
Figure 6B:
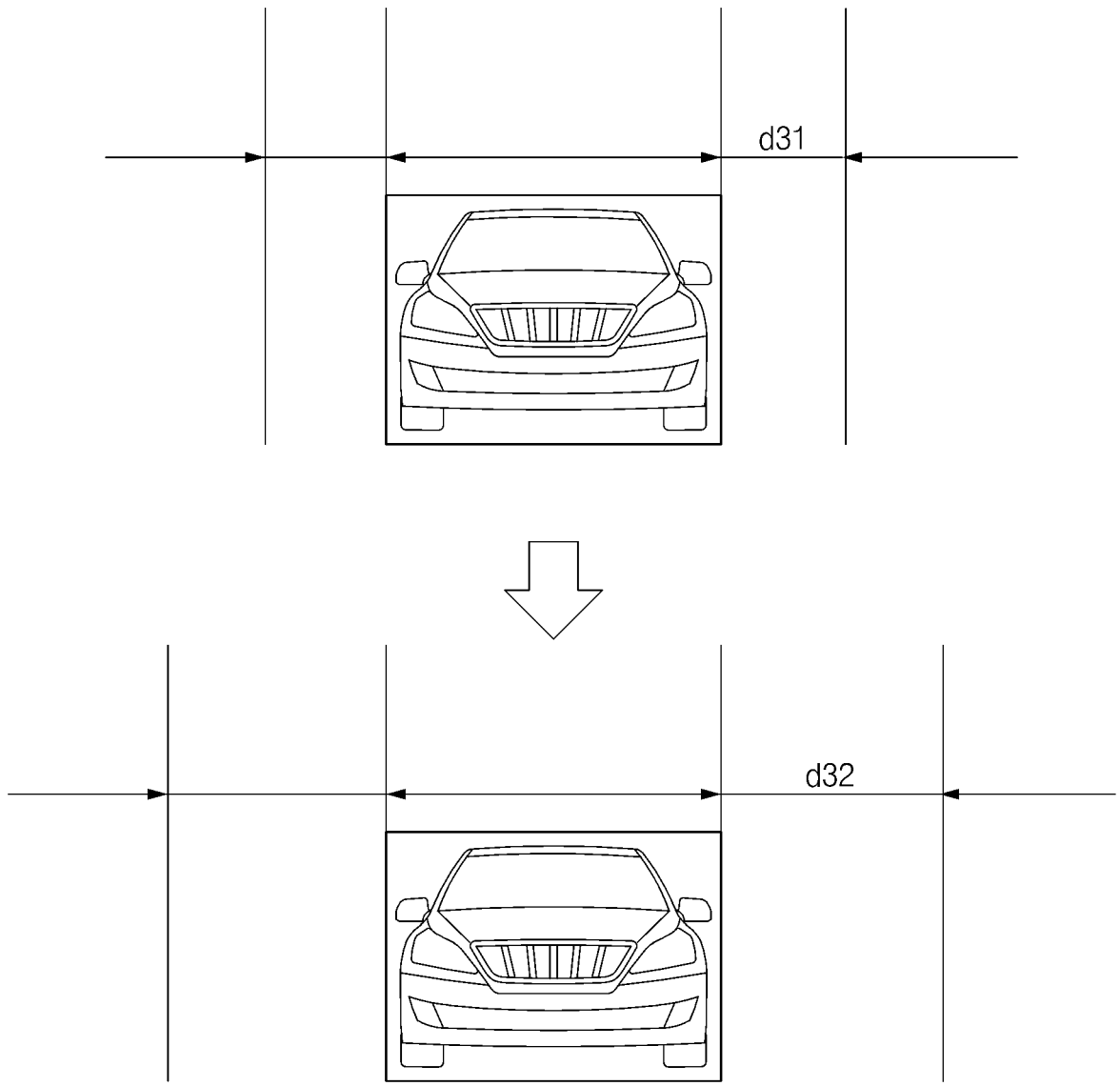

FIGS. 5A and 5B are diagrams illustrating an example of adjusting the margin width of the anti-glare area on a straight road. FIGS. 6A and 6B are diagrams illustrating an example of adjusting the margin width of the anti-glare area on a curved road.

First, referring to FIGS. 5A and 5B, in the case of a straight road, because the vehicle 10 is positioned side by side with the front vehicle 20, the left and right widths of the front vehicle 20 are narrow. However, the example of FIGS. 5A and 5B may correspond to a case in which the front vehicle 20 drives in the same lane as the vehicle 10.

In this case, because the left and right widths of the front vehicle 20 are narrow so that the range of the segments occupied by the front vehicle 20 in the light-on/off frequency pattern is narrowed, the sum of the light-on/off frequencies of the segments in which the front vehicle 20 is located may be less than a default value.

Accordingly, the controller 110 may adjust the margin width d31 of the anti-glare area for the front vehicle 20 on a straight road to be narrower than the margin width d of the anti-glare area set as a default.

Meanwhile, referring to FIGS. 6A and 6B, in the case of a left curved road, because the front vehicle 20 is inclined to the left, the left and right widths of the front vehicle 20 are wide. In this case, because the left and right widths of the front vehicle 20 are wide so that the range of segments occupied by the front vehicle 20 in the light-on/off frequency pattern increases, the sum of the light-on/off frequencies of the segments in which the front vehicle 20 is located may be greater than the default value.

Accordingly, the controller 110 may adjust the margin width d41 of the anti-glare area for the front vehicle 20 on the curved road to be wider than the margin width "d" of the anti-glare area set as a default.

As described above, when the margin width of the anti-glare area for the front vehicle 20 is adjusted, the controller 110 may control the headlamp based on the adjusted margin width.

The operation flow of the apparatus for controlling an intelligent lamp according to the present disclosure configured as described above will be described in more detail as follows.

Figure 7:
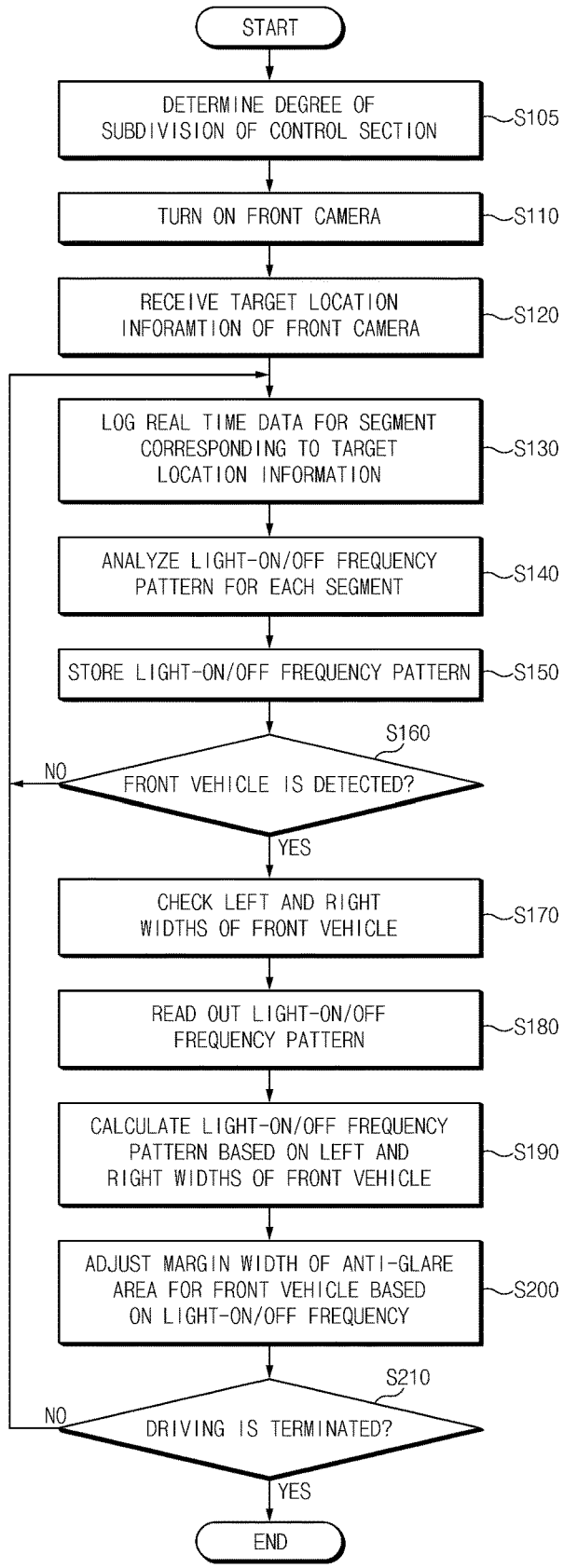
FIG. 7 is a flowchart illustrating a method of controlling an intelligent lamp according to an embodiment of the present disclosure.

FIG. 7 is a flowchart illustrating a method of controlling an intelligent lamp according to an embodiment of the present disclosure.

Referring to FIG. 7, in S105, the apparatus 100 for controlling an intelligent lamp may determine the degree of subdivision of the control area of the camera 120 before turning on the camera 120 for photographing the road ahead.

In this case, the degree of subdivision for the control area of the camera 120, which is based on determining how many virtual matrix control sections to divide the control area of the camera 120 into, may be determined by dividing the FOV of the camera 120 by the number N of segments. In this case, the apparatus 100 for controlling an intelligent lamp may divide the control area of the camera 120 into a plurality of virtual matrix control sections according to the determined degree of subdivision, and may recognize each divided virtual matrix control section as one segment.

The operation S105 may be omitted when the degree of subdivision is maintained as a default.

In S110, the apparatus 100 for controlling an intelligent lamp turns on the camera 120 when the degree of subdivision for the control section of the camera 120 is determined.

In this case, the camera 120 may start to capture an image of the road ahead, and obtain target location information for a subdivided control section (virtual matrix control section).

Accordingly, the apparatus 100 for controlling an intelligent lamp receives target location information for a subdivided control section (virtual matrix control section) from the camera 120 in S120, and logs real time data in real time for each segment corresponding to the received target location in S130. In this case, the apparatus 100 for controlling an intelligent lamp analyzes the light-on/off frequency pattern by using the data logged for each segment in S130 and stores the light-on/off frequency pattern in S140.

The operations S130 and S140 may be repeatedly performed while the vehicle 10 is driving, and may be performed every specified time period.

When the front vehicle 20 is detected in S160, the apparatus 100 for controlling an intelligent lamp checks the left and right widths of the front vehicle 20 in S170.

In this case, the apparatus 100 for controlling an intelligent lamp reads out the light-on/off frequency pattern stored in the operation S140 in S180, and in S190, calculates the light-on/off frequency of the segment corresponding to the left and right widths of the front vehicle 20 checked based on the light-on/off frequency pattern in operation S170. As an example, when the left and right widths of the front vehicle 20 are included in the segments of −5 to 5, the light-on/off frequency in the segment of −5 to 5 is calculated.

The apparatus 100 for controlling an intelligent lamp may calculate a value obtained by summing the light-on/off frequencies of each segment calculated in operation S190.

In S200, the apparatus 100 for controlling an intelligent lamp may adjust the margin width of the anti-glare area for the front vehicle 20 based on the light-on/off frequency calculated in operation S190.

Thereafter, the apparatus 100 for controlling an intelligent lamp may control the headlamp based on the margin width of the anti-glare area adjusted in operation S200.

The operations S130 to S200 may be repeatedly performed until the driving is finished, and when the driving is finished in S210, all related operations are terminated.

According to the embodiments of the present disclosure, it is possible to subdivide the control area of a camera into micro-sections (segments) to analyze in real time the light-on/off frequency pattern for each micro-section according to the driving environment and location, and variably adjust the margin width of an anti-glare area according to the light-on/off frequency for each location of a front or preceding vehicle, thereby minimizing glare to a driver of the front vehicle while improving visibility of the driver through control of a headlamp.

As described above, according to the embodiments of the present disclosure, by variably controlling the margin width of the anti-glare area according to the driving environment and location, it is possible to minimize the glare of the driver of the front vehicle 20 while improving visibility of the driver.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling an intelligent lamp, comprising:
   a camera configured to capture an image of a control area in front of a vehicle;
   a pattern analysis device configured to check a target location for the control area, log data for each segment corresponding to the target location, and analyze a light-on/off frequency pattern; and
   a controller configured to, when a preceding vehicle is detected, adjust a margin width of an anti-glare area with respect to the preceding vehicle by calculating a light-on/off frequency corresponding to a location of the preceding vehicle based on the light-on/off frequency pattern.

2. The apparatus of claim 1, wherein the controller is configured to determine a degree of subdivision of the control area by dividing a field of view (FOV) of the camera into a number of segments.

3. The apparatus of claim 2, wherein the controller is configured to divide the control area into a plurality of virtual matrix control sections corresponding to the degree of subdivision, and recognize each of the divided virtual matrix control sections as one of the segments.

4. The apparatus of claim 3, wherein the controller is configured to obtain target location information for each of the virtual matrix control sections.

5. The apparatus of claim 1, wherein the pattern analysis device is configured to:
   recognize a number of times an LED of a headlamp is turned on and then turned off for each segment as one cycle; and
   determine the number of times the LED is turned on and off within a specified time.

6. The apparatus of claim 1, wherein the light-on/off frequency pattern varies corresponding to a driving environment and a location of the vehicle.

7. The apparatus of claim 1, wherein the controller is configured to:
   calculate a light-on/off frequency for each segment corresponding to the location of the preceding vehicle; and
   adjust the margin width of the anti-glare area for the preceding vehicle based on a sum of the light-on/off frequencies for each segment.

8. The apparatus of claim 7, wherein the controller is configured to adjust the margin width of the anti-glare area for the preceding vehicle to be wider as the sum of the light-on/off frequencies for each segment increases.

9. The apparatus of claim 8, wherein the controller is configured to adjust the margin width of the anti-glare area for the front vehicle to be wider when the preceding vehicle is located closer to the vehicle than when the preceding vehicle is located farther away from the vehicle.

10. The apparatus of claim 8, wherein the controller is configured to adjust the margin width of the anti-glare area for the preceding vehicle to be wider when the preceding vehicle travels on a curved road than when the preceding vehicle travels on a straight road.

11. The apparatus of claim 1, further comprising a data collection device configured to collect driving environment information of a road on which the vehicle travels.

12. A method of controlling an intelligent lamp, the method comprising:
analyzing a light-on/off frequency pattern by checking a target location for a control area in front of a vehicle and logging data for each segment corresponding to the target location; and
adjusting a margin width of an anti-glare area for a preceding vehicle by calculating a light-on/off frequency corresponding to a location of the preceding vehicle based on the light-on/off frequency pattern when the preceding vehicle is detected.

13. The method of claim 12, further comprising determining a degree of subdivision of the control area by dividing a field of view (FOV) of the camera into a number of segments before analyzing the light-on/off frequency pattern.

14. The method of claim 12, wherein determining the degree of subdivision of the control area includes dividing the control area into a plurality of virtual matrix control sections corresponding to the degree of subdivision.

15. The method of claim 14, further comprising obtaining target location information for each of the virtual matrix control sections through the camera.

16. The method of claim 12, wherein analyzing the light-on/off frequency pattern includes:
recognizing a number of times an LED of a headlamp is turned on and then turned off for each segment as one cycle; and
determining the number of times the LED is turned on and off within a specified time.

17. The method of claim 12, wherein adjusting the margin width of the anti-glare area includes:
calculating the light-on/off frequency for each segment corresponding to the location of the preceding vehicle; and
adjusting the margin width of the anti-glare area for the preceding vehicle based on a sum of light-on/off frequencies for each segment.

18. The method of claim 17, wherein adjusting the margin width of the anti-glare area includes adjusting the margin width of the anti-glare area for the preceding vehicle to be wider as the sum of the light-on/off frequencies for each segment increases.

19. The method of claim 18, wherein adjusting the margin width of the anti-glare area includes adjusting the margin width of the anti-glare area for the preceding vehicle to be wider when the preceding vehicle is located closer to the vehicle than when the preceding vehicle is located farther away from the vehicle.

20. The method of claim 18, wherein the adjusting of the margin width of the anti-glare area includes adjusting the margin width of the anti-glare area for the preceding vehicle to be wider when the preceding vehicle travels on a curved road than when the front vehicle travels on a straight road.

* * * * *